United States Patent [19]
Cadd

[11] Patent Number: 5,881,095
[45] Date of Patent: Mar. 9, 1999

[54] REPEATER ASSISTED CHANNEL HOPPING SYSTEM AND METHOD THEREFOR

[75] Inventor: Jimmy W. Cadd, Coral Springs, Fla.

[73] Assignee: Motorola, Inc., Schaumburg, Ill.

[21] Appl. No.: 846,449

[22] Filed: May 1, 1997

[51] Int. Cl.[6] .......................... H04B 1/713; H04B 7/204; H04J 1/10

[52] U.S. Cl. .................. 375/202; 375/211; 370/320; 370/492; 370/501; 455/515; 455/519

[58] Field of Search ...................... 375/202, 211, 375/219; 455/509, 515, 517–519; 370/315, 319–322, 342, 344, 347, 441, 443, 458, 461, 479, 492, 501

[56] References Cited

U.S. PATENT DOCUMENTS

| | | | |
|---|---|---|---|
| 5,423,055 | 6/1995 | Diaz et al. | 455/15 |
| 5,502,722 | 3/1996 | Fulghum | 370/69.1 |
| 5,504,750 | 4/1996 | Fulghum et al. | 370/95.1 |
| 5,586,120 | 12/1996 | Cadd | 370/468 |
| 5,594,947 | 1/1997 | Grube et al. | 455/509 |

*Primary Examiner*—Amanda Le
*Attorney, Agent, or Firm*—Andrew S. Fuller

[57] ABSTRACT

A radio communication system (100) includes a repeater (111) that operates with a transceiver (132) on a channel hopping sequence. The repeater receives a request for repeater service transmitted by the transceiver (410), and responds by obtaining a communication slot on the channel hopping sequence (420). The repeater then executes a call setup procedure with the transceiver and with other participants of a communicating group (430). Preferably, the call setup procedure provides the repeater with information on the suitability of the communication slot (440). The repeater then retransmits information received on an inbound channel on a corresponding outbound channel using the communication slot, as the slot transitions across the channel hopping sequence (460, 470).

16 Claims, 5 Drawing Sheets

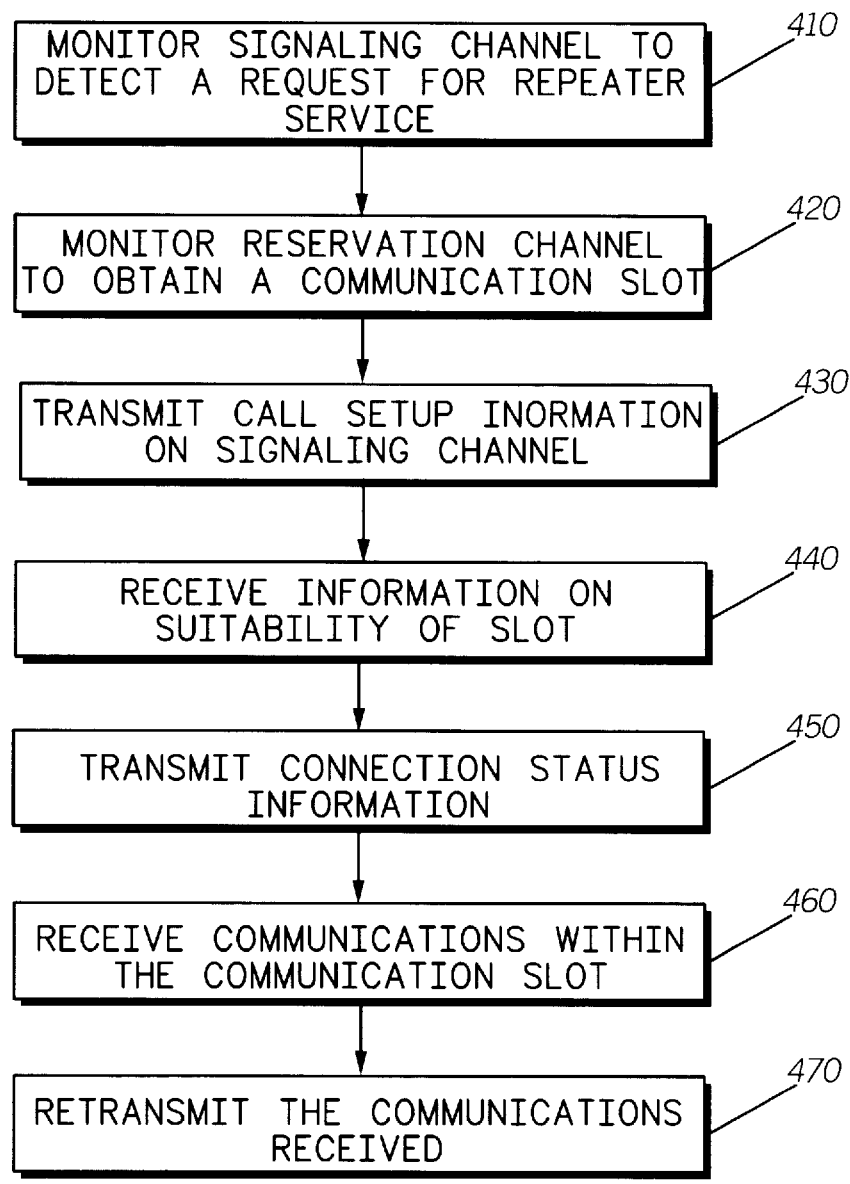

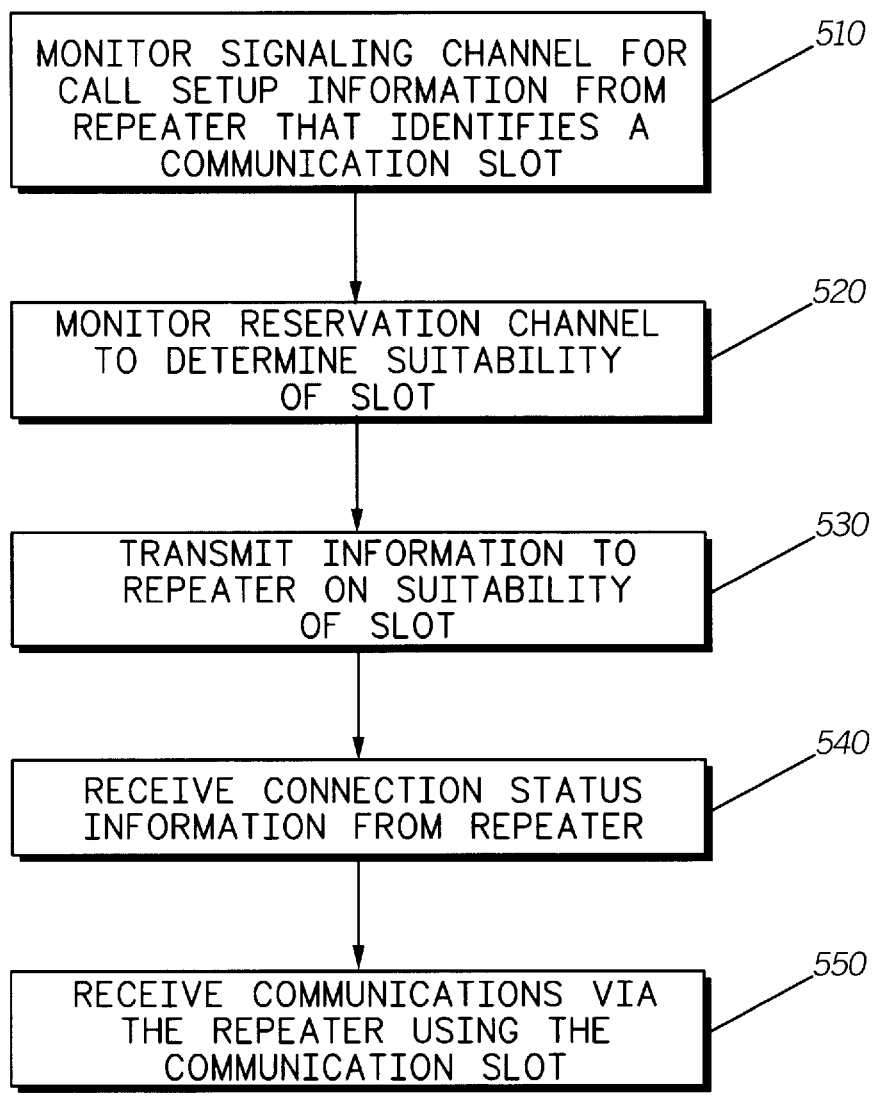

REPEATER ASSISTED CHANNEL HOPPING SYSTEM AND METHOD THEREFOR

TECHNICAL FIELD

This invention relates in general to radio communication systems, and more particularly, systems that use channel hopping to operate over shared communication channels.

BACKGROUND

Radio communication systems operating over shared frequencies usually employ a frequency management methodology to promote the efficient use of available frequencies, and to minimize interference among users. In a typical implementation, the radio communication system has infrastructure equipment that manages frequency assignments, user access, collision detection and resolution, and other operational aspects of the system. Such infrastructure equipment tend to represent a significant cost in the establishment of a radio communication system. Recently, low cost radio communication systems have been proposed that involve self organizing communication units that do not depend on infrastructure equipment for frequency management. One such system is described in U.S. Pat. No. 5,430,775 issued to Fulghum, et al. on Jul. 4, 1995, for a Method and Apparatus for a Radio Communication System. Here, a radio communication system operates over a sequence of communication channels using a channel hopping protocol. The channel hopping protocol allows participating communication units to establish communication groups which coexist with other communication groups using the same set of frequencies, all without the use of infrastructure equipment.

Repeater systems are well known in the art. Generally, a repeater allows a communication unit to increase its coverage range by receiving and retransmitting signals from that communication unit. It is desirable to provide for the use of repeaters in radio communication systems that utilize a channel hopping protocol with decentralized frequency management. Prior art channel hopping systems do not adequately address the incorporation of repeaters in this manner. Therefore, a new radio communication system that provides for repeater assisted channel hopping is needed.

BRIEF DESCRIPTION OF THE DRAWINGS

FIG. 4 is a flowchart of procedures used at a repeater transceiver to assist communications between subscriber transceivers of a communicating group, in accordance with the present invention.

FIG. 5 is a flowchart of procedures used at a subscriber transceiver, operating in receive mode, and participating in a communication group, in accordance with the present invention.

DETAILED DESCRIPTION OF THE PREFERRED EMBODIMENT

The present invention provides for repeater assistance for communicating groups operating under a channel hopping protocol. The channel hopping protocol provides for a channel hopping sequence with corresponding inbound and outbound channels. A repeater facilitates communication between first and second transceivers by receiving communications via the inbound channel, and retransmitting this communication via the outbound channel. To establish a communicating group, an initiating transceiver transmits a request for repeater service to the repeater. The repeater responds by obtaining a communication slot on the channel hopping sequence, and by transmitting call setup information relating to the communication slot on a signaling channel that is monitored by potential participants of the communicating group. Potential members of the communicating group, including the initiating transceiver, determine suitability of the communication slot, preferably by monitoring a corresponding reservation channel to determine potential interference. Information corresponding to the suitability of the communication slot is transmitted to the repeater. When the communication slot is determined to be suitable, the repeater completes the call setup and proceeds to retransmit information received on the inbound channel on the corresponding outbound channel using the communication slot.

Figure 1:
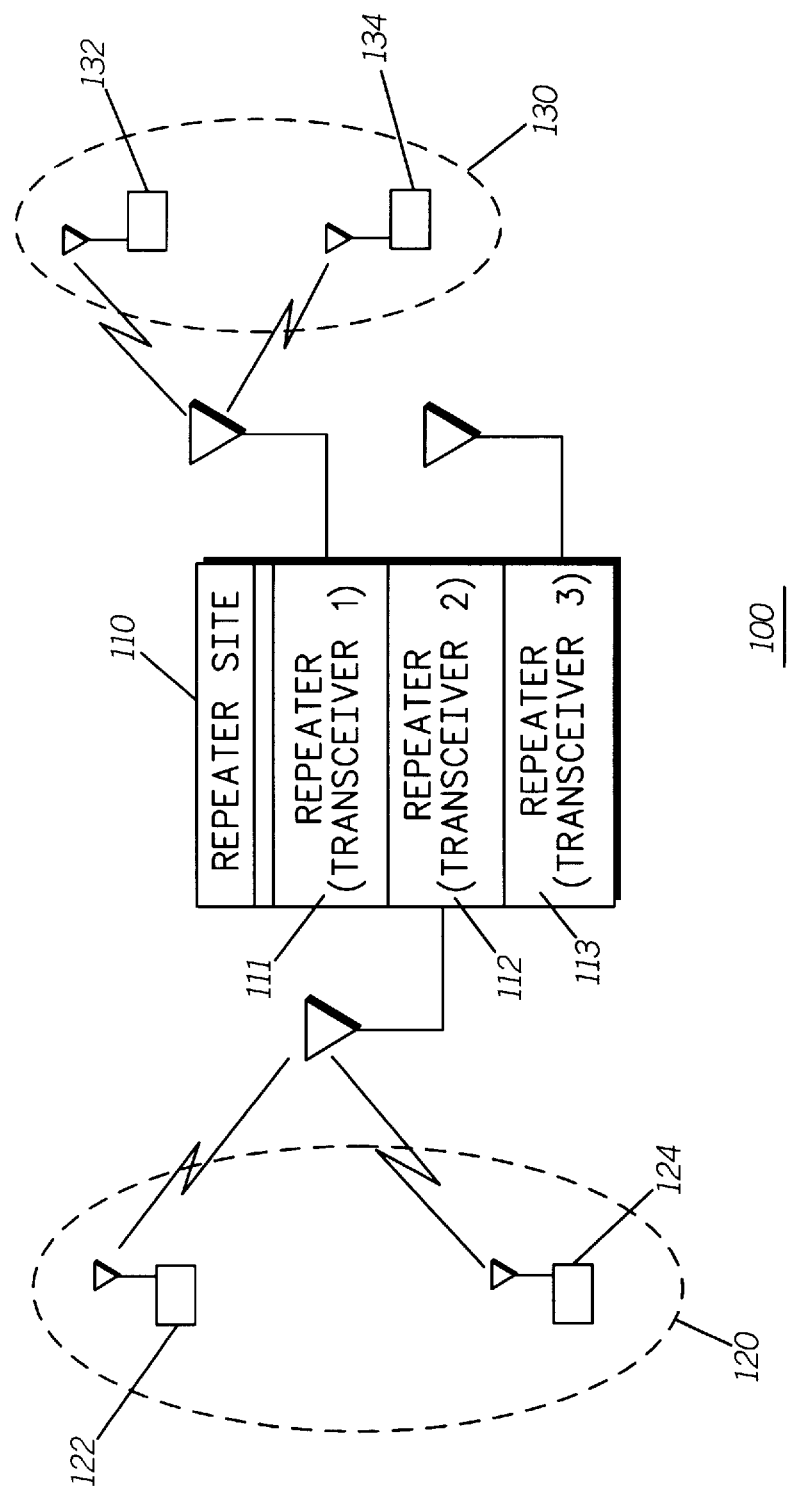
FIG. 1 is a block diagram of a radio communication system having groups of transceivers communicating via a repeater site, in accordance with the present invention.

Referring now to FIG. 1, a radio communication system 100 is shown that supports repeater assisted communication, in accordance with the present invention. The radio communication system 100 includes a repeater site 110 that services groups of communicating transceivers 120, 130. The repeater site 110 has multiple repeater or base transceivers 111, 112, 113 each capable of supporting a wireless communication link among members of a communicating group. For example, a first group 120 includes transceivers 122, 124 having established a communication link via repeater transceiver 112. Similarly, a second communication group 130 has transceivers 132, 134 having established a communication link via repeater transceiver 111. Each repeater transceiver operates to receive transmissions from a member of a communicating group on an inbound channel and to retransmit such transmissions on an outbound channel. An arbitration protocol selects one of the repeater transceivers to respond to a particular request for repeater service.

According to the present invention, a repeater transceiver operates in tandem with one or more members of a communicating group according to a predefined channel hopping protocol. The channel hopping protocol governs the use of a set of communication channels including access methods, hop sequence, channel hop characteristics, among others. Generally, a set of communication channels is organized into a sequence for channel hopping purposes. A communication channel can viewed as orthogonal communication space. For example, a communication channel may comprise one or more frequency channels, such as a transmit and receive pair or similar grouping. A communication channel may also be defined by time slots on a particular frequency channel, such as in a time division multiple access system, or by a particular code assignment in a code division multiple access system. The channel hopping sequence can be viewed as either a separate inbound and outbound channel hopping sequence, or a single hopping sequence with inbound and outbound channel pairs. The channel hopping protocol further defines a channel hop period, i.e., the period of time which a transceiver, or group of transceivers may spend continuously utilizing a given communication channel. Multiple communicating groups may simultaneously use a particular channel hopping sequence by operating within a communication slot on that sequence. A communication slot is generally communication space on a particular channel, which communication space moves or cycles through successive channels of the channel hop sequence after each hop period. In the preferred embodiment, the communication slot is represented by a time slot equal in duration to the channel hop period. The accumulated time spent on each pass through the channel hopping sequence by communicating group is referred to as the hop cycle. A general discussion of the operation of a communication system using a channel hopping protocol can be found in U.S. Pat. No. 5,504,750 issued on Apr. 2, 1996, to Fulghum et al. for a Method And Apparatus For A Radio System Operating On Shared Communication Channels, the entire contents of which are hereby incorporated by reference.

Figure 2:
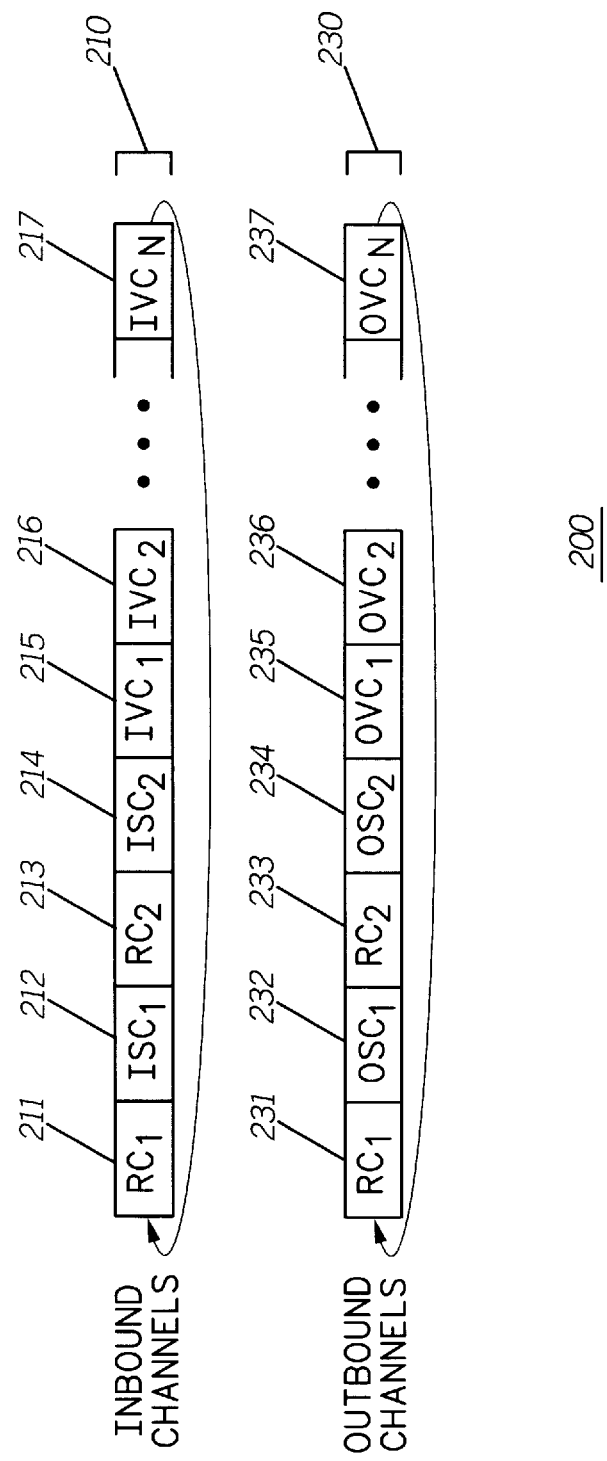
FIG. 2 is a block diagram showing inbound and outbound channel designations for a channel hopping sequence used for communicating via the repeater site, in accordance with the present invention.

FIG. 2 shows a channel hopping sequence 200, in accordance with the present invention. The channel hopping sequence has sets of inbound channels 210 and outbound channels 230. In the preferred embodiment, the inbound channels include, in sequence, a first reservation channel ($RC_1$) 211; a signaling channel ($ISC_1$) 212; a reservation channel ($RC_2$) 213; a signaling channel ($ISC_2$) 214; and voice/data channels ($IVC_{1-N}$) 215,216,217. Similarly, the outbound channels include a reservation channel ($RC_1$) 231 a signaling channel ($OSC_1$) 232; a reservation channel ($RC_2$) 233; a signaling channel ($OSC_2$) 234; and voice/data channels ($OVC_{1-N}$) 235, 236, 237, in that order. Generally, a transceiver or group of transceivers operating on the sequence of communication channels secures a communication slot which cycles through the channel hopping sequence. Note that in the preferred embodiment, the reservation channels are shared between the inbound and outbound sequence of channels. Thus, the first reservation channel 211, 231 on the inbound and outbound sequences respectively are shared. Similarly, the second reservation channel 213, 233 is also shared. Reservation channels are used to facilitate acquisition and maintenance of a communication slot on the sequence of communication channels. Generally, a communication slot is reserved by monitoring a reservation channel for a reservation signal. The absence of a reservation signal on the reservation channel for a predetermined duration, typically equivalent to a channel hop period is indicative of the availability of a communication slot. The reservation channel is also used to preserve a communication slot for communicating groups already operating on the sequence. A transceiver operating on the sequence of communication channels and wishing to secure its communication slot for a subsequent cycle on the sequence transmits a reservation signal while on the reservation channel. The reservation signal may assume various formats which are widely described in the art.

The reservation signal of the preferred embodiment has some preferred characteristics. Preferably, the reservation signal is transmitted such that is has an extended communicational transmission range, beyond that of the communication range of signals on other communication channels of the sequence. This may be accomplished by lowering data transmission rates, by providing more robust transmit symbols, or by increasing the transmit power. In the preferred embodiment, a pseudo-random noise sequence code is used to communicate the reservation signal. The extended range afforded by the reservation channel offers additional protection from potential interferers operating outside the normal communication range of a member of a communicating group, but within communication range of another member.

Figure 3:
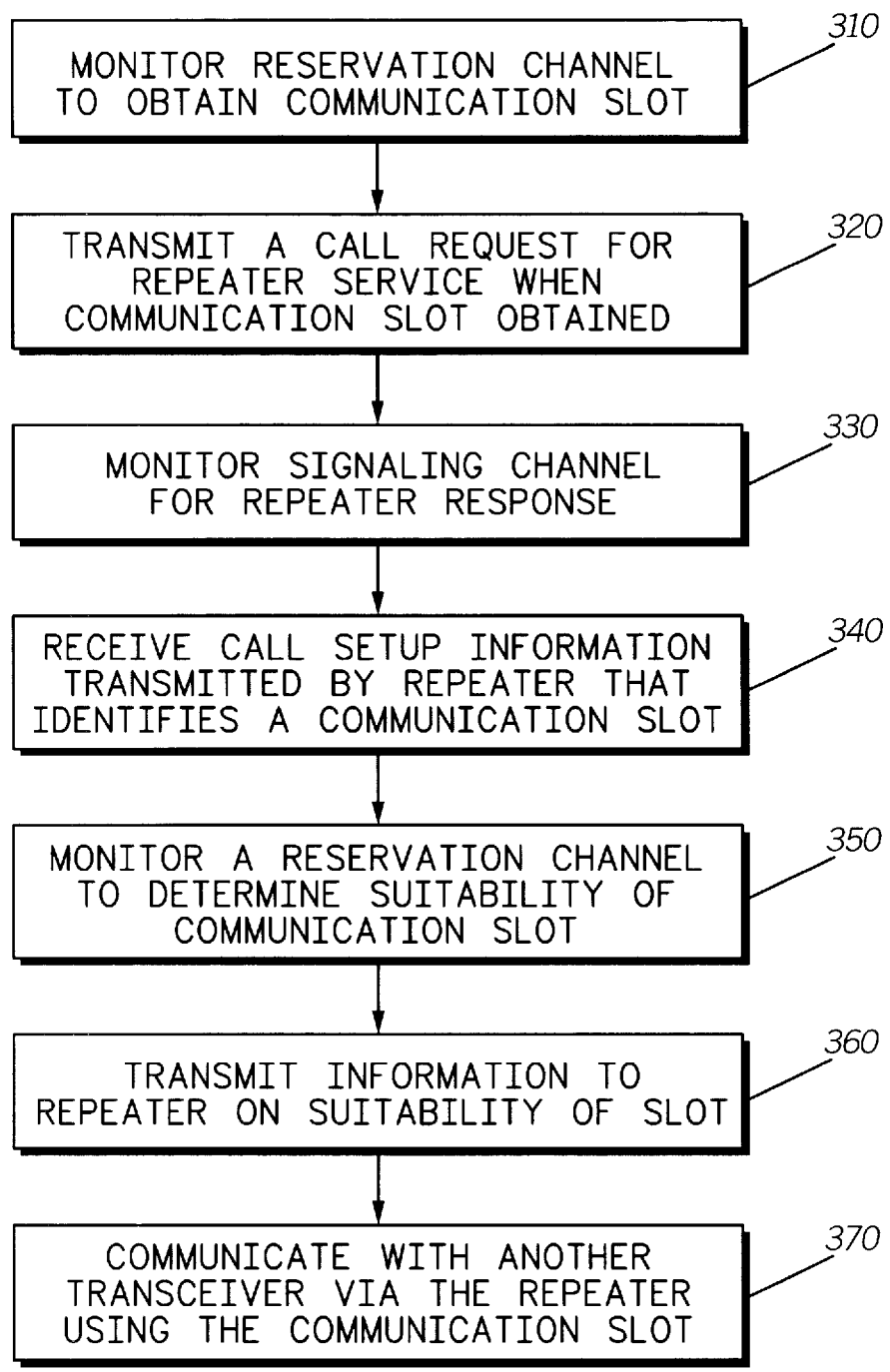
FIG. 3 is a flowchart of procedures used by a subscriber transceiver operating in transmit mode to initiate repeater assisted communications, in accordance with the present invention.

FIG. 3 is a flowchart of procedures used by a transmitting transceiver for system acquisition, in accordance with the present invention. Generally, the transmitting transceiver operates to obtain the services of a repeater in order to establish a communication link with a target transceiver of group of transceivers. To initiate a communication link, the transmitting transceiver first performs system acquisition in order to enable communications on the channel hopping sequence. With reference to FIG. 2, the transmitting transceiver monitors the reservation channel 231 in order to obtain a communication slot, step 310. Preferably, the transmitting transceiver monitors the reservation channel 231 for a particular time duration, equivalent to a channel hop period, to determine the presence of a reservation signal. The transmitting transceiver determines that a communication slot (also referred to as a system aquisition slot) exists on the channel hopping sequence when no reservation signal is detected during the particular duration. If a reservation signal was detected on the reservation channel, the transmitting transceiver preferably delays a random amount of time before retrying. Upon obtaining a communication slot, the transmitting transceiver transmits a call request for repeater service, step 320. Preferably, the request for repeater service is transmitted while operating on the inbound signaling channel 212. The outbound signaling channel 232 is then monitored for a response from the repeater, step 330. The transmitting transceiver then receives call set up information transmitted by the repeater that identifies a communication slot, step 340. Next, transmitting transceiver monitors the reservation channel 233 to determine suitability of the communication slot, step 350. The reservation channel 233 is monitored for a time duration corresponding to the communication slot to detect a reservation signal. When no reservation signal is detected during monitoring, information is transmitted to the repeater indicating suitability of the communication slot, step 360. This suitability information is preferably transmitted on the signaling channel 214. The transmitting transceiver monitors the outbound signaling channel 234 for confirmation that the call set up was successful. If such confirmation is received, the transmitting transceiver proceeds to communicate with other transceivers via the repeater using the communication slot, step 370. The transceiver cycle operates on successive channels of the channel hopping sequence while communicating with other transceivers. When on a reservation channel, the transceiver transmit a reservation channel to maintain the communication slot. The reservation signal is preferably a pseudo random noise sequence code.

The use of multiple reservation channels in the sequence facilitates the maintenance of a good communication link among the members of the communicating group. In the preferred embodiment, after transmitting on the first reservation channel, the transmitter transceiver delays one hop period to allow receivers to notify the receiver if the communication link is being degraded. The transmitting transceiver then continues by transmitting the reservation signal on the second reservation channel 213. The transmitting transceiver is then able to monitor the second signaling channel 234 for connection status information that may determine whether to continue with transmissions. Ordinarily, when transmission is completed, the transmitting transceiver communicates a disconnect code to the receiver.

Thus, the transceiver receives repeater service from the repeater and is operable to obtain a system acquisition slot on the channel hopping sequence, and to transmit a request for repeater service to the repeater within the system acquisition slot. The transceiver receives in response information on a communication slot and is responsive to that information to determine suitability of a communication slot and to confirm suitability of the communication slot to the repeater.

FIG. 4 is a flowchart of procedures used at the repeater, in accordance with the present invention. With reference to FIGS. 2 and 4, the repeater monitors the signaling channel 212 to detect a request for repeater service from a transmitting communication device, step 410. The repeater then monitors the reservation channel 211 to obtain a communication slot, step 420. Preferably, the repeater monitors a reservation channel 211 for particular duration, equal to the channel hop period, to determine the presence of a reservation signal. The repeater determines that an open communication slot exists on the channel hopping sequence when no reservation signal is detected during the particular duration. Upon obtaining a communication slot, the repeater executes a setup procedure with the communication device. The repeater transmits call setup information on the signaling channel 232, step 430. The repeater then waits while potential participants monitor the reservation channel 231 to determine whether the communication slot is suitable from their respective positions. The repeater then receives information on the suitability of the communication slot, step 440, and if the slot was deemed available transmits connection status information on the signaling channel 234, step 450. Ordinarily, the connection status information includes call status and communication slot timing information. The repeater then waits to receive communications within the identified communication slot, step 460, as that communication slot traverses the voice channels. Communications received via the inbound voice channels 215, 216, 217, are retransmitted on the outbound voice/data channels 235, 236, 237, step 470.

FIG. 5 is a flowchart of procedures used at a receiving transceiver participating in a communication group via the repeater, in accordance with the present invention. A receiving transceiver is defined as a transceiver participating in the communicating group but not initiating transmission. The receiving transceiver monitors the signaling channel 232 for call setup information from the repeater that identifies the communication slot, step 510. The receiving transceiver then monitors the reservation channel 233 to determine suitability of the communication slot as described earlier, step 520. The suitability information is then transmitted to the repeater on the signaling channel 214, step 530. The receiving transceiver monitors the signaling channel 234 to receive connection status information from the repeater, step 540. The receiving transceiver then receives communication via the repeater on the communication slot, as the communication slot traverses successive voice/data channels of the channel hopping sequence, step 550.

The present invention provides a significant contribution to the prior art. Transceivers may now self-organize into communicating groups using a channel hopping protocol, while employing the services of a repeater. The channel hopping protocol provides a variety of safeguards to ensure the maintenance of good communication links. Thus, the advantages of repeater assisted communications have been brought into a system that employs channel hopping frequency management that is not administered by central infrastructure equipment.

What is claimed is:

1. A method, comprising the steps of:
monitoring a signaling channel to detect a request for repeater service from a communication device;
monitoring a reservation channel to determine when there exists a communication slot on an inbound channel hopping sequence, when the request for repeater service is detected;
executing a setup procedure with the communication device, when an open communication slot exists on the inbound channel hopping sequence;
receiving communications from the communication device within the open communication slot as the communication slot transitions across channels of the inbound channel hopping sequence; and
retransmitting the communications received from the communication device on a corresponding communication slot of an outbound channel hopping sequence.

2. The method of claim 1, wherein the step of monitoring a reservation channel, comprises the steps of:
monitoring the reservation channel for a particular duration to determine presence of a reservation signal; and
determining that an open communication slot exists on the inbound channel hopping sequence when no reservation signal is detected during the particular duration.

3. The method of claim 1, wherein the step of executing a setup procedure, comprises the steps of:
transmitting call status and communication slot timing information to the communication device; and
receiving information from the communication device regarding suitability of the open communication slot from the communication device.

4. The method of claim 3, wherein the step of executing a setup procedure, comprises the step of, transmitting call setup information to a target communication device.

5. The method of claim 1, further comprising the steps of:
cyclically operating on successive channels of the inbound channel hopping sequence; and
transmitting a reservation signal on the reservation channel, when operating on the reservation channel.

6. The method of claim 5, wherein the step of transmitting a reservation signal comprises the step of transmitting a pseudo-random noise sequence code.

7. A method of employing a repeater in a channel hopping protocol to facilitate communication between first and second transceivers, the method comprising the steps of:
at the first transceiver:
(a) monitoring a reservation channel for a particular duration to detect a reservation signal;
(b) transmitting a request for repeater service to the repeater, when no reservation signal is detected within the particular duration;
(c) receiving information transmitted by the repeater identifying a communication slot;
(d) monitoring a reservation channel for a time duration corresponding the communication slot to detect a reservation signal;
(e) transmitting information to the repeater indicating suitability of the communication slot, when no reservation signal is detected during the monitoring of step (d); and
(f) communicating with the second transceiver via the repeater using the communication slot.

8. The method of claim 7, wherein step (c) comprises the step of monitoring a particular signaling channel to detect a targeted transmission from the repeater.

9. The method of claim 7, further comprising the steps of:
at the repeater:
receiving the request for repeater service from the first transceiver;
monitoring a reservation channel to determine when there exists a communication slot on a channel hopping sequence;
transmitting communication slot information to the first transceiver, when a communication slot exists on the channel hopping sequence;
receiving information from the first transceiver confirming suitability of the communication slot; and operating to retransmit communications received from the first transceiver to the second transceiver using the communication slot.

10. In a system having first and second transceivers, and a repeater to facilitate communication therebetween, the system employing a channel hopping protocol including a channel hopping sequence having corresponding inbound and outbound channels, a method comprising the steps of:

at the first transceiver:
(a) obtaining a first communication slot on the channel hopping sequence;
(b) transmitting a request for repeater service to the repeater within the first communication slot while operating on a first signaling channel of the channel hopping sequence;

at the repeater:
(c) receiving the request for repeater service from the first transceiver;
(d) obtaining a second communication slot on the channel hopping sequence;
(e) transmitting information on the second communication slot to the first transceiver;

at the first transceiver:
(f) receiving the information on the second communication slot from the repeater;
(h) determining whether the second communication slot is suitable for communications;
(i) confirming suitability of the second communication slot to the repeater;
(j) communicating, using the second communication slot, particular information to the repeater for retransmission to the second transceiver;

at the repeater using the second communication slot:
(k) receiving the particular information for retransmission on an inbound channel; and
(l) retransmitting the particular information on an outbound channel corresponding to the inbound channel.

11. The method of claim 10, wherein:
step (d) comprises the step of monitoring a first reservation channel to detect an absence of a reservation signal for a particular duration, which absence indicates availability of the second communication slot; and
step (h) comprises the step of monitoring a second reservation channel to detect an absence of a reservation signal during a time period corresponding to the second communication slot.

12. The method of claim 11, wherein the inbound and outbound channels are identical for the first reservation channel, and for the second reservation channel.

13. A radio communication system, comprising:
a repeater site having a base transceiver operable to communicate according to a channel hopping protocol that defines an inbound channel hopping sequence and an outbound channel hopping sequence that comprise a plurality of inbound and outbound channels, respectively, including a reservation channel, and inbound and outbound signaling channels, wherein the base transceiver is responsive to a request for repeater service received on the inbound signaling channel to monitor the reservation channel for a communication slot, to transmit information on the communication slot, when detected, on the outbound signaling channel, and to retransmit, using the communication slot, communications received on an inbound channel on a corresponding outbound channel, while channel hopping according to the channel hopping protocol.

14. The radio communication system of claim 13, wherein the repeater site further comprises a plurality of base transceivers, and a arbitration protocol that selects one of the plurality of base transceivers to respond to a particular request for repeater service.

15. The radio communication system of claim 13, further comprising:
a subscriber transceiver that receives repeater service from the base transceiver, the subscriber transceiver being operable to obtain a system acquisition slot on the inbound channel hopping sequence, and to transmit a request for repeater service to the base transceiver within the system acquisition slot and to receive in response information on the communication slot, the subscriber transceiver being responsive to information on the communication slot to determine suitability of the communication slot, and to confirm suitability of the communication slot to the base transceiver.

16. A radio communication system having a repeater that supports a channel hopping protocol that defines an inbound channel hopping sequence and an outbound channel hopping sequence that comprise a plurality of inbound and outbound channels, respectively, including a reservation channel, the system comprising:
a subscriber transceiver that receives repeater service from the repeater, the subscriber transceiver being operable to obtain a system acquisition slot on the inbound channel hopping sequence by monitoring the reservation channel, to transmit a request for repeater service to the repeater within the system acquisition slot and to receive in response information on a communication slot, the subscriber transceiver being responsive to information on the communication slot to determine suitability of the communication slot, and to confirm suitability of the communication slot to the repeater.

* * * * *